United States Patent Office.

ABNER D. WILLIS, OF CRAWFORDSVILLE, INDIANA.

Letters Patent No. 98,535, dated January 4, 1870.

IMPROVED MEDICAL COMPOUND.

The Schedule referred to in these Letters Patent and making part of the same.

To all whom it may concern:

Be it known that I, ABNER D. WILLIS, of the city of Crawfordsville, in the county of Montgomery, and State of Indiana, have invented a Medical Compound, which is an alexipharmic for all poisons obtained from the excessive use of intoxicating liquors, and also a cure for *mania à potu* or *delirium tremens*. It will invigorate and restore the system from any derangement that has been brought on by the excessive use of intoxicating draughts, and will also destroy the desire for all intoxicating drinks. It is also an antidote for the poisons received from the bite of venomous serpents or from the sting of insects, when applied as a lotion.

And I do hereby declare that the following is a full and exact description of the different compounds and extracts of which the said compound is made, viz, alcohol, distilled water, *Coptis trifolia* root, *Hydrastis Canadensis* root, hydrastin, and elixir of vitriol.

The compound is made as follows, to wit:

Take, of the crude root of *Coptis trifolia*, one ounce, and one ounce of *Hydrastis Canadensis* root, put in one pint of alcohol, and let remain twenty-four hours; then add one pint of water, and let stand ten days; then add sixty grains of hydrastin and one-half ounce of elixir of vitriol, shake the same well, and it will be ready for use.

What I claim as my invention, and desire to secure by Letters Patent of the United States, is—

The compound, composed of alcohol, water, *Coptis trifolia* root, *Hydrastis Canadensis* root, hydrastin, and elixir of vitriol, a medical compound of the ingredients in or about the proportions as set forth in the specification above, when used for the purposes specified.

A. D. WILLIS.

Witnesses:
WALTER S. BRITTON,
AUSTIN B. ANDERSON.